United States Patent
Kimura et al.

(10) Patent No.: US 6,911,414 B2
(45) Date of Patent: Jun. 28, 2005

(54) CATALYST FOR PURIFYING EXHAUST GAS

(75) Inventors: Mareo Kimura, Aichi-gun (JP); Yoriko Hasegawa, Aichi-gun (JP); Norihiko Aono, Ogasa-gun (JP); Seiji Tanaka, Ogasa-gun (JP)

(73) Assignee: Cataler Corporation, Shizuoka (JP)

( * ) Notice: Subject to any disclaimer, the term of this patent is extended or adjusted under 35 U.S.C. 154(b) by 156 days.

(21) Appl. No.: 09/987,711

(22) Filed: Nov. 15, 2001

(65) Prior Publication Data

US 2002/0098975 A1 Jul. 25, 2002

(30) Foreign Application Priority Data

Nov. 27, 2000 (JP) ........................................ 2000-358875

(51) Int. Cl.$^7$ ............................................... B01J 29/06
(52) U.S. Cl. ................... 502/349; 502/302; 502/304; 502/325; 502/337; 502/338; 502/326; 502/339; 502/350; 502/64
(58) Field of Search ................... 502/349, 302, 502/304, 325, 337, 338, 326, 339, 350, 64, 65, 66, 71, 73, 74, 77, 78, 79

(56) References Cited

U.S. PATENT DOCUMENTS

| | | | | |
|---|---|---|---|---|
| 4,026,823 A | * | 5/1977 | Van Hook et al. ........... 502/337 |
| 5,015,617 A | * | 5/1991 | Ohata et al. ................. 502/304 |
| 5,039,647 A | | 8/1991 | Ihara et al. |
| 5,155,077 A | * | 10/1992 | Montreuil et al. ............ 502/66 |
| 5,610,117 A | * | 3/1997 | Horiuchi et al. ............ 502/324 |
| 5,719,097 A | * | 2/1998 | Chang et al. ................ 502/325 |
| 5,989,457 A | * | 11/1999 | Seshan et al. ............... 252/373 |
| 6,025,297 A | | 2/2000 | Ogura et al. |
| 6,107,239 A | * | 8/2000 | Qin et al. .................... 502/300 |
| 6,193,942 B1 | * | 2/2001 | Okuda et al. ............. 423/213.2 |
| 6,265,342 B1 | * | 7/2001 | Lim et al. .................... 502/326 |
| 2002/0016259 A1 | * | 2/2002 | Yoshikawa .................. 502/324 |

FOREIGN PATENT DOCUMENTS

| | | | |
|---|---|---|---|
| EP | 0 427 493 A2 | | 5/1991 |
| EP | 1 034 832 | * | 9/2000 |
| EP | 1 046 423 A2 | | 10/2000 |
| JP | A 1-171626 | | 7/1989 |
| JP | 3-221144 | * | 9/1991 |
| JP | A 4-267928 | | 9/1992 |
| JP | 10-174878 | * | 6/1998 |
| WO | WO 92/05861 | * | 4/1992 |

* cited by examiner

*Primary Examiner*—Christina Johnson
(74) *Attorney, Agent, or Firm*—Oliff & Berridge, PLC

(57) ABSTRACT

A catalyst for purifying an exhaust gas includes zirconia particles, and a transition metal layer, covering at least a part of a surface of the zirconia particles in a lamellar manner. It can reduce the emission of particulate materials (i.e., P.M.), such as SOF and sulfates, because the contacting area enlarges between the transition metal layer and materials to be purified.

25 Claims, 2 Drawing Sheets

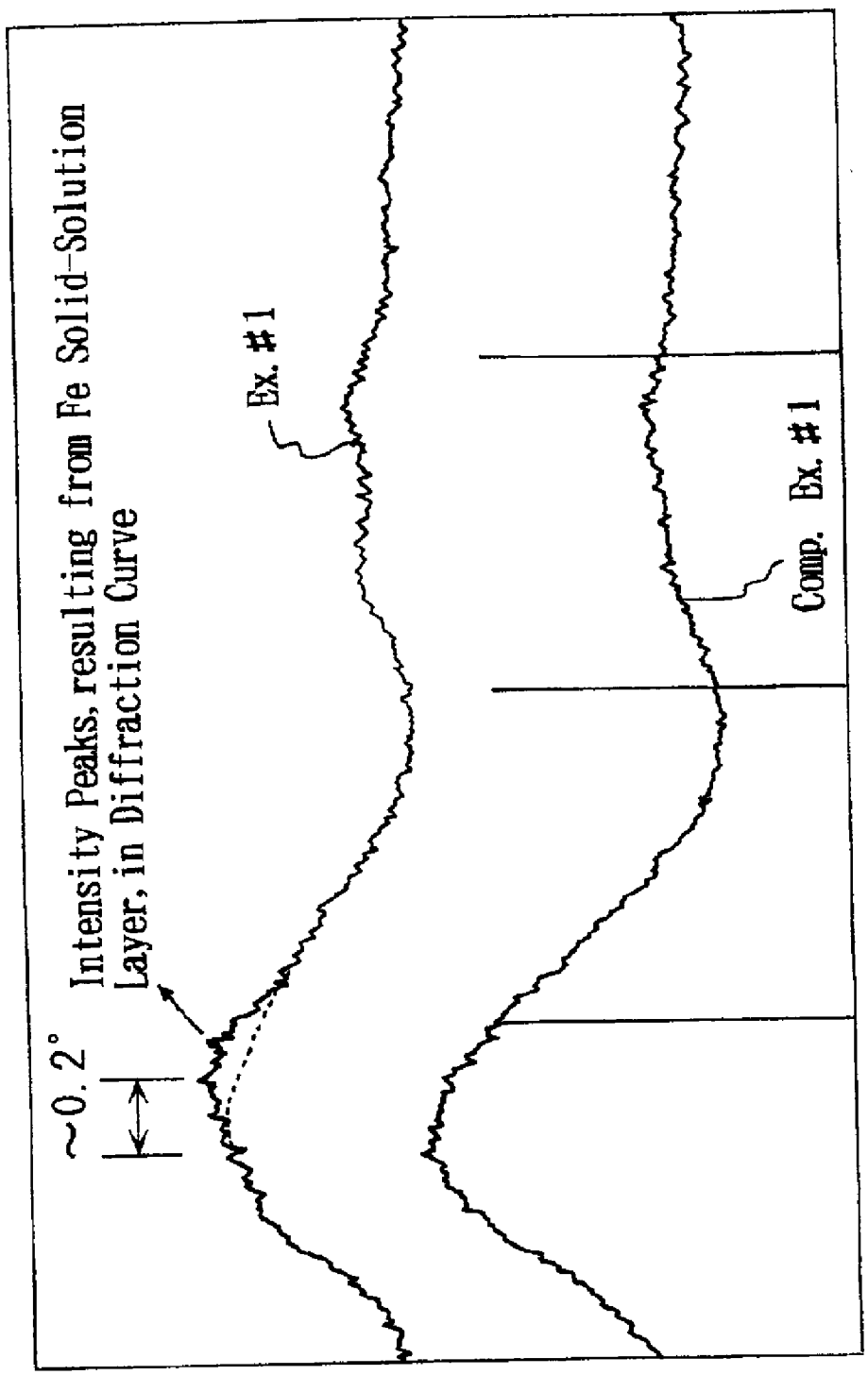

ized to generate $SO_3$ and
CATALYST FOR PURIFYING EXHAUST GAS

BACKGROUND OF THE INVENTION

1. Field of the Invention

The present invention relates to a catalyst, which can efficiently purify soluble organic fractions (i.e., SOF) and soot-like components in an exhaust gas, being emitted from a diesel engine (hereinafter abbreviated to "DE "), and which can reduce the emission of particulate materials.

2. Description of Related Art

Concerning gasoline engines, the harmful materials in the exhaust gases, which are emitted therefrom, have been reduced steadily because of the severe regulations on the exhaust gases and the developments of the techniques for coping with the regulations. However, concerning DE's, the regulations and the developments of the techniques are behind those of the gasoline engines because of the singular circumstance that the harmful components are mainly emitted as particulate materials. Accordingly, it has been desired to develop an exhaust gas purifying catalyst, which can securely purify the harmful components.

The purifying apparatuses for exhaust gases emitted from DE's, which have been developed so far, can be roughly divided into two categories. For example, there have been known an apparatus, to which a method using a trap is applied, and an apparatus, to which an open type SOF decomposition catalyst is applied. The former apparatus can be further divided into two categories, i.e., an apparatus without using a catalyst and an apparatus provided with a catalyst. Among them, the apparatus, to which a method using a filter is applied, captures the particulate materials by the filter so as to suppress the emission, and is especially effective to exhaust gases whose dry soot contents are high. However, there remain many problems to be solved in the apparatus, to which a method using a filter is applied, when the apparatus is put into actual applications. For instance, the apparatus requires a recycling apparatus for burning the captured particulate materials; when the captured particulate materials are burned, the filter may suffer from cracks in recycling; the filter might be clogged up by ashes; the apparatus might be complicated in terms the system, and so on.

On the other hand, in the apparatus to which an open type SOF decomposition catalyst is applied, a catalyst is utilized in which a catalytic ingredient, such as a platinum group element, is loaded on a loading layer, such as an activated alumina, similarly to a catalyst for purifying an exhaust gas, which is emitted from a gasoline engine, as disclosed in Japanese Unexamined Patent Publication (KOKAI) No. 1-171,626, for example. The catalyst oxidizes and decomposes SOF together with CO and HC to purify them. The open type SOF decomposition catalyst has a drawback in that it exhibits a low reduction efficiency to dry soot. However, it is possible to reduce the content of dry soot by improving DE's and fuels themselves. Moreover, the apparatus has a great merit in that it does not require a recycling apparatus. Accordingly, furthermore technical improvements are expected to develop in the apparatus, to which an open type SOF decomposition catalyst is applied, in the future.

However, an open type SOF decomposition catalyst has a disadvantage in that the activities of the catalytic ingredient might be so low under a low temperature condition that the conversion of SOF lowers, though it can efficiently decompose SOF under an elevated temperature condition. Consequently, when the temperature of an exhaust gas is low as in the period of starting a DE, idling a DE, or the like, a phenomenon might occur in which un-decomposed SOF turn into soot and deposit in the honeycomb-shaped passages of the open type SOF decomposition catalyst. Then, a drawback might arise in that the catalyst is clogged up by the deposited soot so that the catalytic performance degrades.

Moreover, in an open type SOF decomposition catalyst, there might be a problem in that even $SO_2$, which is contained in an exhaust gas, is oxidized to generate $SO_3$ and $SO_4$ in a high temperature region, and that the resulting $SO_3$ and $SO_4$ are turned into sulfates so that the emission of particulate materials increases inversely. This results from the fact that $SO_2$ is not measured as particulate materials but $SO_3$ and $SO_4$ are measured as particulate materials because they are turned into and are emitted as sulfates. In particular, in exhaust gases, which are emitted from DE's, the oxidation reaction of $SO_2$ is likely to take place, because an oxygen gas is present in a large amount therein.

In addition, in an open type SOF decomposition catalyst, it has been known that the catalytic ingredient is subjected to poisoning by sulfur, which is contained in exhaust gases, being emitted from DE's, in a large amount, so that the catalytic activities of the catalytic ingredient lower. Namely, $SO_2$, which derives from sulfur in fuels, reacts with alumina in the catalytic loading layer to generate aluminum sulfate $(Al_2(SO_4)_3)$. Thus, the catalytic activities degrade, because the resulting aluminum sulfate covers the catalytic ingredient.

While, in the field of processing exhaust gases, which are emitted from boilers, a catalyst has been developed in which titania $(TiO_2)$, having a good sulfur poisoning resistance, is used as a catalytic loading layer and a catalytic ingredient, such as Pt, V, or the like, is loaded on the catalytic loading layer, and has been put into actual applications. However, such a catalyst does not exhibit an adsorption ability to SOF, and accordingly allows to emit HC as well as SOF as they are in a low temperature region.

In Japanese Unexamined Patent Publication (KOKAI) No. 4-267,928, there is proposed a catalytic apparatus for purifying an exhaust gas, which is emitted from a DE. In the catalytic apparatus, a first catalyst, which has a coating layer, such as an activated alumina layer, a zeolite layer, or the like, exhibiting a high adsorption ability, and which does not have a catalytic ingredient, is disposed on an upstream side of an exhaust gas flow; and a second catalyst, which has a second coating layer, such as a titania layer, a silica layer, or the like, exhibiting a low adsorption ability, and which has a catalytic ingredient loaded on the catalytic loading layer, is disposed on a downstream side of the exhaust gas flow.

In accordance with the catalytic apparatus, not only HC and SOF but also $SO_2$ are adsorbed onto the upstream side first catalyst when the exhaust gas temperature is low, but $SO_2$ is inhibited from being oxidized because the upstream side first catalyst does not have a catalytic ingredient. Then, in the downstream side second catalyst, HC and SOF, which are emitted from the upstream side first catalyst when the exhaust gas temperature is high, are oxidized and purified by the catalytic ingredient. While, $SO_2$ is also emitted from the upstream side first catalyst, $SO_2$ is inhibited from adsorbing onto and being oxidized by the downstream side second catalyst, because the downstream side second catalyst exhibits a low adsorption ability. Thus, the generation of sulfates is suppressed.

However, even the above-described catalytic apparatus for purifying an exhaust gas, which is emitted from a DE, is not satisfactory in terms of the purifying performance of SOF as well as the sulfur poisoning resistance. Consequently, it has been required to further improve the catalytic apparatus in terms of them.

SUMMARY OF THE INVENTION

The present invention has been developed in view of the aforementioned circumstances. It is therefore an object of the present invention to make it possible to efficiently purify not only CO and HC, which are contained in an exhaust gas, being emitted from a DE, but also SOF and particulate materials, which are composed of sulfates, and the like.

A catalyst for purifying an exhaust gas according to a first aspect of the present invention achieves the aforementioned object, and comprises: zirconia particles; and a transition metal layer covering at least a part of a surface of the zirconia particles in a lamellar manner.

A catalyst for purifying an exhaust gas according to a second aspect of the present invention also achieves the aforementioned object, and comprises: a co-catalyst powder including zirconia particles, and a transition metal layer covering at least a part of a surface of the zirconia particles in a lamellar manner; and at least one member selected from the group consisting of a titania powder and a zeolite powder.

In the present exhaust gas purifying catalysts set forth above, the transition metal layer can preferably be formed by loading a salt of a transition metal on heat-resistant zirconia particles and thereafter calcining it at 800° C. or more in an inert gas atmosphere or an oxidizing gas atmosphere.

In the present exhaust gas purifying catalysts set forth above, at least one member selected from the group consisting of neodymium (Nd) and cerium (Ce) can preferably be added in an amount of from 1 to 80 atomic % with respect to zirconum (Zr) in heat-resistant zirconia particles, and at least a part of an oxide, being composed of at least one member selected from the group consisting of neodymium (Nd) and cerium (Ce), can preferably form a solid solution or a composite oxide with zirconia ($ZrO_2$) therein.

In the present exhaust gas purifying catalysts set forth above, the transition metal layer can preferably include at least one metallic element selected from the group consisting of iron (Fe), nickel (Ni), cobalt (Co) and copper (Cu).

The present exhaust gas purifying catalysts set forth above can preferably be further loaded with a noble metal.

In accordance with the present exhaust gas purifying catalysts, it is possible to efficiently purify not only CO and HC, which are contained in an exhaust gas, being emitted from a DE, but also SOF and particulate materials, which are composed of sulfates, and the like.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 3 is an X-ray diffraction chart on the co-catalyst powders in the catalysts of Example No. 1 and Comparative Example No. 2.

DETAILED DESCRIPTION OF THE PREFERRED EMBODIMENTS

Figure 1:
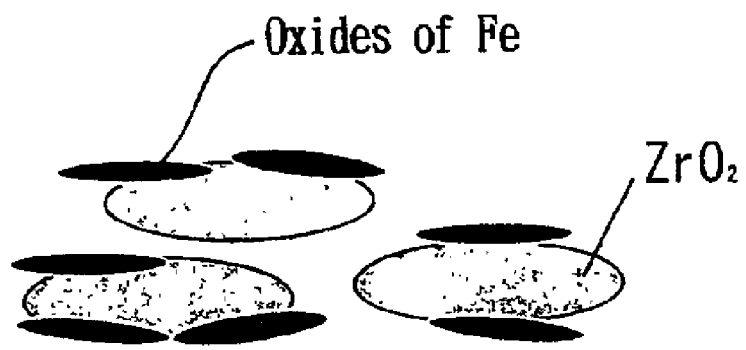
FIG. 1 is an explanatory drawing for conceptually illustrating an arrangement of a co-catalyst powder in a catalyst of Example No. 1 according to the present invention.

Having generally described the present invention, a further understanding can be obtained by reference to the specific preferred embodiments which are provided herein for the purpose of illustration only and not intended to limit the scope of the appended claims.

The catalyst for purifying an exhaust gas according to the first aspect of the present invention comprises zirconia particles and a transition metal layer. The transition metal layer covers at least a part of a surface of the zirconia particles in a lamellar manner. In the catalyst, the contacting area enlarges between the transition metal and the particulate materials, such as SOF, soot, and the like, by the lamellar transition metal layer. Therefore, it is possible to purify the particulate materials with a high purifying rate.

When a part of the transition metal is solved into zirconia, or when a part of the transition metal is composited with zirconia, the oxidizing activity of the transition metal is suppressed. Hence, the oxidation of $SO_2$ can be restrained, and accordingly the generation of sulfates can be inhibited.

The catalyst for purifying an exhaust gas according to the second aspect of the present invention comprises a co-catalyst powder and at least one member selected from the group consisting of a titania powder and a zeolite powder. The co-catalyst powder includes zirconia particles and a transition metal layer, which covers at least a part of a surface of the zirconia particles in a lamellar manner. When the catalyst comprises a titania powder, $SO_2$ is refrained from being adsorbed because titania is an acidic oxide. Accordingly, sulfates can be inhibited from generating. Moreover, when a noble metal is further loaded on the catalyst, an action arises in which the sulfur poisoning of the noble metal is prevented by the titania powder. On the other hand, zeolite adsorbs HC and SOF well. Consequently, when the catalyst comprises a zeolite powder, the purifying activities of HC and SOF can be improved. Thus, when the catalyst comprises both of a titania powder and a zeolite powder, the actions of the both of them are effected. Accordingly, not only the purifying rates of HC and SOF can be enhanced, but also the generation of sulfates can be inhibited. Therefore, it is possible to efficiently purify the particulate materials.

As described above, the co-catalyst powder includes zirconia particles and a transition metal layer, which covers at least a part of a surface of the zirconia particles in a lamellar manner. Hence, as mentioned earlier, the contacting area enlarges between the transition metal and the particulate materials, such as SOF, soot, and the like, by the lamellar transition metal layer. Therefore, the purifying activities of the particulate materials can be upgraded. Moreover, when a part of the transition metal is solved into zirconia, or when a part of the transition metal is composited with zirconia, the oxidizing activity of the transition metal is suppressed. Hence, the oxidation of $SO_2$ can be restrained, and accordingly the generation of sulfates can be inhibited.

Thus, in the exhaust gas purifying catalyst according to the second aspect of the present invention, the action of either one of the titania powder and zeolite powder as well as the action of the co-catalyst are effected synergetically. Therefore, it is possible to efficiently purify not only CO and HC, which are contained in an exhaust gas, being emitted from a DE, but also the particulate materials, which are composed of SOF, sulfates, etc.

As for the titania powder, it is preferable to use a titania powder exhibiting a BET specific surface area of 50 $m^2/g$ or more. The larger the specific surface area is, in the more highly dispersed manner a noble metal can be loaded on the titania powder. Accordingly, the resulting catalyst can be improved in terms of the catalytic activities. The titania powder can preferably be comprised in an amount of from 20 to 70% by weight with respect to the entire catalyst. When the titania powder is comprised less than the lower limit, it is difficult to effect the aforementioned actions of titania. When the titania powder is comprised more than the upper limit, the contents of the other components decrease relatively, the catalytic activities of the resulting catalyst degrade consequently.

As for the zeolite powder, the zeolite powder is not limited in particular as far as it adsorbs HC. However, it is preferable to use at least one member selected from the group consisting of mordenite, ZSM-5, USY, ferrierite, zeolite beta, and so on, because they adsorb HC in a large amount. The zeolite powder can preferably be comprised in an amount of from 10 to 30% by weight with respect to the entire catalyst. When the zeolite powder is comprised less than the lower limit, the adsorption abilities to HC and SOF lowers so that the purifying activities of the resulting catalyst decrease. When the zeolite powder is comprised more than the upper limit, the contents of the other components decrease relatively, the catalytic activities of the resulting catalyst degrade consequently.

The core member of the exhaust gas purifying catalyst according to the first aspect of the present invention or the co-catalyst of the exhaust gas purifying catalyst according to the second aspect of the present invention can be ordinary zirconia particles. However, the zirconia particles can preferably be heat-resistant zirconia particles. When the core member is thus constituted by heat-resistant zirconia particles, the granular growth of zirconia can be suppressed even when the present exhaust gas purifying catalysts are put into service at an elevated temperature. Accordingly, it is possible to inhibit the contacting surface between the transition metal and the particulate materials from diminishing. As a result, it is possible to keep the high purifying activities to SOF and soot.

As for the heat-resistant zirconia particles, it is preferable to use zirconia particles into which at least one of rare-earth elements is solved or in which zirconia is composited with at least one of rare-earth elements. Above all, it is preferable to use heat-resistant zirconia particle in which at least one member selected from the group consisting of neodymium and cerium is added in an amount of from 1 to 80 atomic % with respect to zirconium and in which at least a part of an oxide, being composed of at least one member selected from the group consisting of neodymium and cerium, forms a solid solution or a composite oxide with zirconia. When at least one member selected from the group consisting of neodymium and cerium is added in an amount of less than 1 atomic % with respect to zirconium, the advantage resulting from the improved heat resistance does not arise. When at least one member selected from the group consisting of neodymium and cerium is added in an amount of more than 80 atomic % with respect to zirconium, $SO_2$ is likely to adsorb on the resulting zirconia particles so that the amount of generating sulfates enlarges.

As for the transition metal constituting the transition metal layer, it is preferable to use at least one member selected from the group consisting of Fe, Ni, Co and Cu. The other transition metals degrade the purifying activities of the resulting catalyst to HC and SOF.

It is proper that the transition metal layer covers at least a part of a surface of the zirconia particles or the heat-resistant zirconia particles in a lamellar manner. Note that the transition metal layer can cover the entire surface of the zirconia particles or the heat-resistant zirconia particles. It is preferable to arrange so that the transition metal layer cover the surface of the zirconia particles or the heat-resistant zirconia particles by a rate of from 10 to 80%. When the transition metal layer covers the surface of the zirconia particles or the heat-resistant zirconia particles by a rate of less than 10%, the purifying activities resulting from the transition metal hardly appear. When the transition metal layer covers the surface of the zirconia particles or the heat-resistant zirconia particles by a rate of more than 80%, a drawback might arise in that the amount of generating sulfates enlarges.

The formation amount of the transition metal layer can preferably fall in a range of from 2 to 10 parts by weight with respect to 100 parts by weight of the zirconia particles or the heat-resistant zirconia particles. When the transition metal layer is formed in an amount of less than the lower limit, the resulting catalyst exhibits lowered soot and SOF purifying rates. When the transition metal layer is formed in an amount of more than the upper limit, there might be a case where the amount of generating sulfates enlarges.

The transition metal layer can be formed by utilizing a known method, such as a PVD method, a CVD method, and so on. Above all, it is preferable to form the transition metal layer in the following manner. For instance, a salt of a transition metal is loaded on the zirconia particles or the heat-resistant zirconia particles, and is thereafter calcined at 800° C. or more in an inert gas atmosphere or an oxidizing gas atmosphere. By thus forming the transition metal layer, a part of the transition metal solves into zirconia, or forms a composite oxide together with zirconia. Thus, the catalytic activities of the transition metal reduce. Accordingly, $SO_2$ is refrained from being oxidized so that sulfates can be inhibited from generating. When the temperature of the calcination is less than 800° C., it is difficult for the transition metal to solve into zirconia or to form a composite oxide with zirconia. Thus, the resulting catalyst comes to exhibit a degraded purifying rate to the particulate materials.

The co-catalyst powder can preferably be included in an amount of from 50 to 80% by weight with respect to the entire catalyst. When the co-catalyst powder is included less than the lower limit, it is difficult for the resulting catalyst to exhibit the above-described actions of the co-catalyst powder. When the co-catalyst powder is included more than the upper limit, the contents of the other components decrease relatively, the catalytic activities of the resulting catalyst degrade consequently.

Note that the present exhaust gas purifying catalysts can preferably be further loaded with a noble metal. If such is the case, the catalytic activities of the noble metal arise so that the purifying rates of HC, CO and SOF can be further improved and the purifying rate of the particulate materials can be upgraded. As for the noble metal, it is possible to use at least one member selected from the group consisting of platinum (Pt), palladium (Pd), rhodium (Rh), ruthenium (Ru) and iridium (Ir). The loading amount of the noble metal can preferably fall in a range of from 0.01 to 20 g with respect 100 g of either one of the present exhaust gas purifying catalysts. When the noble metal is loaded in an amount of less than the lower limit, the advantages resulting from the loading do not arise. When the noble metal is loaded in an amount of more than the upper limit, the advantages saturate and simultaneously the cost goes up.

The present invention will be hereinafter described in detail with reference to specific examples and a comparative example.

EXAMPLE No. 1

A neodymium nitrate (Nd(NO$_3$)$_3$) aqueous solution was impregnated into a commercially available zirconia powder to load Nd thereon. Note that the zirconia powder exhibited a BET specific surface area of 100 m$^2$/g. The zirconia powder was dried at 150° C. for 1 hour. Thereafter, the zirconia powder was calcined at 800° C. in air for 2 hours. Thus, a heat-resistant zirconia powder was prepared. Note that the heat-resistant zirconia powder included Nd in an amount of 20 atomic % with respect to Zr. As set forth in Table 1 below, the heat-resistant zirconia powder exhibited a BET specific surface area of 69 m$^2$/g. According to the results of an X-ray diffraction analysis, it was verified that a part of Nd was solved into ZrO$_2$.

Subsequently, 800 g of the resulting heat-resistant zirconia powder was mixed into 135 g of an iron nitrate (Fe(NO$_3$)$_3$.9H$_2$O) aqueous solution. While fully stirring the mixture, the mixture was evaporated to dry at 120° C. The dried solid was pulverized in a mortar. Moreover, the pulverized solid was calcined at 850° C. in a nitrogen gas atmosphere for 2 hours. Thus, an iron layer was formed on at least a part of a surface of the heat-resistant zirconia powder. According to the results of an X-ray diffraction analysis, it was verified that a part of Fe in the iron layer formed a solid solution together with ZrO$_2$. A co-catalyst powder was thus prepared which comprised the heat-resistant zirconia powder provided with the iron layer.

820 g of the resulting co-catalyst powder was mixed with 200 g of a titania powder and 200 g of a type ZSM-5 zeolite powder, thereby making a mixture powder. Note that the titania powder exhibited a BET specific surface area of 100 m$^2$/g and the type ZSM-5 zeolite powder exhibited a BET specific surface area of 380 m$^2$/g. The mixture powder was pulverized in a wet manner, thereby turning it into a slurry.

An open-flow type honeycomb-shaped substrate was prepared which was made from cordierite. The honeycomb-shaped substrate was immersed into the slurry, and was taken up therefrom. After removing the excessive slurry from the honeycomb-shaped substrate, the honeycomb-shaped substrate was dried at 250° C. for 1 hour, and thereafter was calcined at 500° C. for 1 hour. Thus, an exhaust gas purifying catalyst of Example No. 1 was prepared. As set forth in Table 3 below, in the exhaust gas purifying catalyst, the iron was included in an amount of 1.4 g as metallic Fe, the heat-resistant zirconia powder was included in an amount of 60 g, the titania powder was included in an amount of 15 g, and the type ZSM-5 zeolite powder was included in an amount of 15 g, respectively, with respect to 1 liter of the honeycomb-shaped substrate.

EXAMPLE No. 2

A cerium nitrate (Ce(NO$_3$)$_3$) aqueous solution was impregnated into a commercially available zirconia powder to load Ce thereon. Note that the zirconia powder exhibited a BET specific surface area of 100 m$^2$/g. The zirconia powder was dried at 150° C. for 1 hour. Thereafter, the zirconia powder was calcined at 800° C. in air for 2 hours. Thus, a heat-resistant zirconia powder was prepared. Note that the heat-resistant powder included Ce in an amount of 30 atomic % with respect to Zr. As set forth in Table 1 below, the heat-resistant zirconia powder exhibited a BET specific surface area of 57 m$^2$/g. According to the results of an X-ray diffraction analysis, it was verified that a part of Ce was solved into ZrO$_2$.

Except that the heat-resistant zirconia powder with Ce added was used instead of the heat-resistant zirconia powder with Nd added, an exhaust gas purifying catalyst of Example No. 2 was prepared in the same manner as Example No. 1.

EXAMPLE No. 3

Except that a commercially available zirconia powder was used instead of the heat-resistant zirconia powder with Nd added, an exhaust gas purifying catalyst of Example No. 3 was prepared in the same manner as Example No. 1. Note that the zirconia powder exhibited a BET specific surface area of 100 m$^2$/g.

EXAMPLE No. 4

800 g of the heat-resistant zirconia powder provided with the iron layer, which was prepared in Example No. 1, and 200 g of a titania powder were mixed, thereby making a mixture powder. A chloroplatinic acid (H$_2$PtCl$_6$) aqueous solution was impregnated into the mixture powder to load Pt thereon. The mixture powder was dried at 120° C. for 1 hour. Thereafter, the mixture powder was calcined at 500° C. in air for 1 hour. Note that the titania powder exhibited a BET specific surface area of 100 m$^2$/g and the chloroplatinic acid aqueous solution included Pt in an amount of 20 g. Except that the resulting mixture powder was used instead of the heat-resistant zirconia powder and the titania powder, which were used in Example No. 1, an exhaust gas purifying catalyst of Example No. 4 was prepared in the same manner as Example No. 1.

COMPARATIVE EXAMPLE No. 1

800 g of a commercially available zirconia powder was mixed into 135 g of an iron nitrate (Fe(NO$_3$)$_3$.9H$_2$O) aqueous solution. Note that the zirconia powder exhibited a BET specific surface area of 100 m$^2$/g. While fully stirring the mixture, the mixture was evaporated to dry at 120° C. The dried solid was pulverized in a mortar. Moreover, the pulverized solid was calcined at 500° C. in air for 1 hour. Thus, Fe was loaded on at least a part of a surface of the zirconia powder. According to the results of an X-ray diffraction analysis, it was verified that the loaded Fe did not form a solid solution together with ZrO$_2$.

Except that the zirconia powder loaded with Fe was used as a co-catalyst powder instead of the heat-resistant zirconia powder provided with the iron layer, an exhaust gas purifying catalyst of Comparative Example No. 1 was prepared in the same manner as Example No. 1.

Examination and Evaluation

A commercially available zirconia powder, which exhibited a BET specific surface area of 100 m$^2$/g, was calcined at 800° C. in air for 2 hours. Thereafter, the zirconia powder was examined for the specific surface area. The result is set forth in Table 1 below.

TABLE 1

|  | C. T.[*1] (° C.) | S. S. A[*2] (m$^2$/g) |
|---|---|---|
| ZrO$_2$ | — | 100 |
| ZrO$_2$ | 800 | 39 |
| 20 atomic % Nd-ZrO$_2$ | 800 | 69 |
| 30 atomic % Ce-ZrO$_2$ | 800 | 57 |

Note:
[*1]stands for "Calcination Temperature".
[*2]stands for "Specific Surface Area".

Compared with the case where ZrO$_2$ was free from Nd or Ce, it is understood from Table 1 that, when Nd or Ce was added to $ZrO_2$, the zirconia powder exhibited an enlarged specific surface area after it was calcined at 800° C. for 2 hours. Hence, it is apparent that Nd and Ce improved the heat resistance of $ZrO_2$.

Moreover, on the catalysts of Example No. 1 and Comparative Example No. 1, the co-catalyst powders were examined for the elemental concentrations in the surfaces by XPS (i.e., X-ray photoelectron spectroscopy). The results are set forth in Table 2 below. In addition, the co-catalysts were subjected to an X-ray diffraction analysis. The results are illustrated in FIG. 3.

TABLE 2

| | Elemental Concentration in Co-catalyst Surface | |
|---|---|---|
| | Fe (atomic %) | Zr (atomic %) |
| Ex. #1 | 3.3 | 20 |
| Comp. Ex. #1 | 1.6 | 23 |

Figure 2:
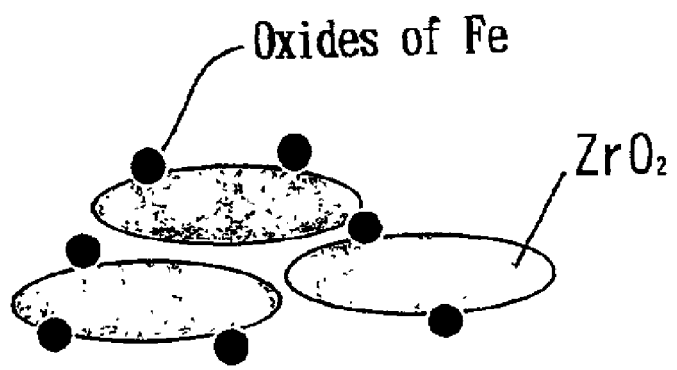
FIG. 2 is an explanatory drawing for conceptually illustrating an arrangement of a co-catalyst powder in a catalyst of Comparative Example No. 1.

In the catalysts of Example No. 1 and Comparative Example No. 1, the compositional ratios of $ZrO_2$ and Fe were identical with each other. However, it is understood from Table 2 that the Fe concentration was higher and the Zr concentration was lower in the surface of the co-catalyst of Example No. 1 than those in the surface of the co-catalyst of Comparative Example No. 1. Therefore, it is possible to consider that the co-catalysts of Example No. 1 and Comparative Catalyst were arranged as schematically illustrated in FIGS. 1 and 2, respectively. It is believed that, in Example No. 1, the oxides of Fe covered at least a part of the surface of the $ZrO_2$ particles in a lamellar manner.

As illustrated in FIG. 3, intensity peaks, which resulted from an Fe solid-solution layer, were appreciated in the diffraction curve of the co-catalyst of Example No. 1. Accordingly, it is seen that at least a part of Fe was solved into $ZrO_2$ in Example No. 1. However, no such intensity peaks were appreciated in the diffraction curve of the co-catalyst of Comparative Example No. 1. Consequently, it is believed that, in Comparative Example No. 1, the oxides of Fe were loaded on the $ZrO_2$ particles in a fine particulate manner as illustrated in FIG. 2.

Following the X-ray diffraction analysis, the catalysts of Example Nos. 1 through 4 and Comparative Example No. 1 were installed to an exhaust system of a natural-inlet and direct-injection type DE. The displacement of the DE was 4,200 c.c. A light oil whose sulfur content was 0.05% by weight was used as a fuel, and an exhaust gas was flowed through the exhaust system for 1 hour under the following conditions:

| DE Revolving Speed: | 2,500 rpm; and |
|---|---|
| Catalyst Inlet-gas Temp.: | 500° C. | under the condition that the catalyst inlet-gas temperature was stabilized at 600° C. at the DE revolving speed of 2,500 rpm, the CO and HC contents were measured at the inlet and outlet of the catalysts, and the respective purifying rates were determined. Moreover, by using a dilution tunnel, particulate materials were captured with a commercially available particulate filter. The purifying rates of particulate materials were determined by the weights of particulate materials at the respective catalyst inlets and the weights of particulate materials at the respective catalyst outlets.

Then, SOF were extracted from the respective particulate filters, which captured particulate materials, by using dichloromethane as a solvent. The purifying rates of SOF were calculated from the SOF contents at the respective catalyst inlets and the SOF contents at the respective catalyst outlets. Moreover, the respective particulate filters, which had been examined for the SOF contents, were subjected to liquid chromatography. The purifying rates of sulfates were calculated from the contents of sulfates at the respective catalyst inlets and the contents of sulfates at the respective catalyst outlets. The results of the each of the measurements are set forth in Table 3 below.

TABLE 3

| | | | | Ex. #1 | Ex. #2 | Ex. #3 | Ex. #4 | Comp. Ex.#1 |
|---|---|---|---|---|---|---|---|---|
| C. P.*1 | H. Z. P*2 (g) | | Nd—$ZrO_2$ | 60 | — | — | 60 | — |
| | | | Ce—$ZrO_2$ | — | 60 | — | — | — |
| | | | $ZrO_2$ | — | — | 60 | — | 60 |
| | | Iron Layer | Calcining Temp. (° C.) | 850 | 850 | 850 | 850 | 500 |
| | | | Fe Content (g) | 1.4 | 1.4 | 1.4 | 1.4 | 1.4 |
| Titania Powder (g) | | | | 15 | 15 | 15 | 15 | 15 |
| Type ZSM-5 Zeolite Powder (g) | | | | 15 | 15 | 15 | 15 | 15 |
| Loaded Noble Metal Species | | | | — | — | — | Pt | — |
| Purifying Rate (%) | | | Particulate Materials | 38 | 45 | 40 | 42 | 33 |
| | | | SOF | 90 | 95 | 92 | 93 | 85 |
| | | | HC | 87 | 90 | 86 | 92 | 92 |
| | | | CO | 13 | 16 | 11 | 92 | 15 |
| Purifying Rate of Sulfates (%) | | | | −1 | −2 | −1 | −15 | −2 |

Note: *1 stands for "Co-catalyst Powder".
*2 stands for "Heat-resistant Zirconia Powder.

It is understood from Table3 that the respective catalysts of Example Nos. 1 through 4 exhibited a higher purifying rate to particulate materials than the catalyst of Comparative Example No. 1 did. It is apparent that the advantage resulted from the arrangements that Fe covered $ZrO_2$ particles partially in a lamellar manner and at least a part of Fe was solved into $ZrO_2$. To put in differently, when the calcination is carried out at 500° C., it is difficult to load Fe in a lamellar manner.

By comparing Example No. 1 with Example No. 4, it is understood that the purifying rates of CO, HC, SOF and particulate materials were improved by loading Pt. Note that the purifying rate of sulfates was lowered by loading Pt so that the amount of generating sulfates enlarged. However, the purifying rate of particulate materials as a whole was enhanced, because the purifying rate of SOF was upgraded.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying an exhaust gas, comprising:
   zirconia particles; and
   a transition metal layer in which at least part of a transition metal is solved into said zirconia particles and which covers at least a part of a surface of said zirconia particles in a lamellar manner.

2. The catalyst according to claim 1, wherein said zirconia particles are heat-resistant zirconia particles.

3. The catalyst according to claim 2, wherein said transition metal layer is formed by loading a salt of a transition metal on said heat-resistant zirconia particles and thereafter calcining it at 800° C. or more in an inert gas atmosphere or an oxidizing gas atmosphere.

4. The catalyst according to claim 2, wherein at least one member selected from the group consisting of neodymium and cerium is added in an amount of from 1 to 80 atomic % with respect to zirconium in said heat-resistant zirconia particles, and at least a part of an oxide, being composed of at least one member selected from the group consisting of neodymium and cerium, forms a solid solution or a composite oxide with zirconia therein.

5. The catalyst according to claim 1, wherein said transition metal layer includes at least one metallic element selected from the group consisting of iron, nickel, cobalt and copper.

6. The catalyst according to claim 1 being further loaded with a noble metal.

7. The catalyst according to claim 1, wherein said transition metal layer covers the surface of said zirconia particles by a rate of from 10 to 80%.

8. The catalyst according to claims 1, wherein said transition metal layer is formed in an amount of from 2 to 10 parts by weight with respect to 100 parts by weight of said resistant zirconia particles.

9. The catalyst according to claim 6, wherein said noble metal is at least one member selected from the group consisting of platinum, palladium, rhodium, ruthenium and iridium.

10. The catalyst according to claim 6, wherein said noble metal is loaded in an amount of from 0.01 to 20 g with respect to 100 g of said catalyst.

11. A catalyst for purifying an exhaust gas, comprising:
    a co-catalyst powder including zirconia particles, and a transition metal layer in which at least a part of a transition metal is solved into said zirconia particles, and a transition metal layer covers at east a part of a surface of said zirconia particles in a lamellar manner; and
    at least one member selected from the group consisting of a titania powder and a zeolite powder.

12. The catalyst according to claim 11, wherein said zirconia particles are heat-resistant zirconia particles.

13. The catalyst according to claim 11, wherein said transition metal layer is formed by loading a salt of a transition metal on said heat-resistant zirconia particles and thereafter calcining it at 800° C. or more in an inert gas atmosphere or an oxidizing gas atmosphere.

14. The catalyst according to claim 12, wherein, in said heat-resistant zirconia particles, at least one member selected from the group consisting of neodymium and cerium is added in an amount of from 1 to 80 atomic % with respect to zirconium, and at least a part of an oxide, being composed of at least one member selected from the group consisting of neodymium and cerium, forms a solid solution or a composite oxide with zirconia.

15. The catalyst according to claim 11, wherein said transition metal layer includes at least one metallic element selected from the group consisting of iron, nickel, cobalt and copper.

16. The catalyst according to claim 11 being further loaded with a noble metal.

17. The catalyst according to claim 11, wherein said titania powder exhibits a BET specific surface area of 50 $m^2/g$ or more.

18. The catalyst according to claim 11 comprising said titania powder in an amount of from 20 to 70% by weight with respect to the entire catalyst.

19. The catalyst according to claim 11, wherein said zeolite powder is composed of at least one member selected from the group consisting of mordenite, ZSM-5, USY, ferrierite and zeolite beta.

20. The catalyst according to claim 11 comprising said zeolite powder in an amount of from 10 to 30% by weight with respect to the entire catalyst.

21. The catalyst according to claim 12, wherein said transition metal layer covers the surface of the heat-resistant zirconia particles by a rate of from 10 to 80%.

22. The catalyst according to claim 12, wherein said transition metal layer is formed in an amount of from 2 to 10 parts by weight with respect to 100 parts by weight of the heat-resistant zirconia particles.

23. The catalyst according to claim 11 comprising said co-catalyst powder in an amount of from 50 to 80% by weight with respect to the entire catalyst.

24. The catalyst according to claim 16, wherein said noble metal is at least one member selected from the group consisting of platinum, palladium, rhodium, ruthenium and iridium.

25. The catalyst according to claim 16, wherein said noble metal is loaded in an amount of from 0.01 to 20 g with respect to 100 g of the catalyst.

* * * * *